Mar. 20, 1923.
E. S. HOYT
1,449,005
THERMOSTATICALLY ACTUATED VALVE
Filed Mar. 16, 1922    2 sheets-sheet 1
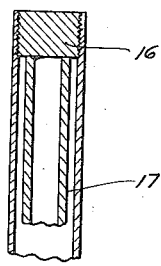
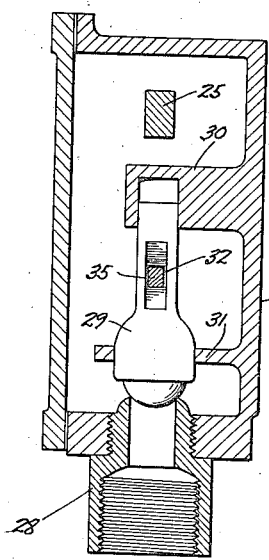
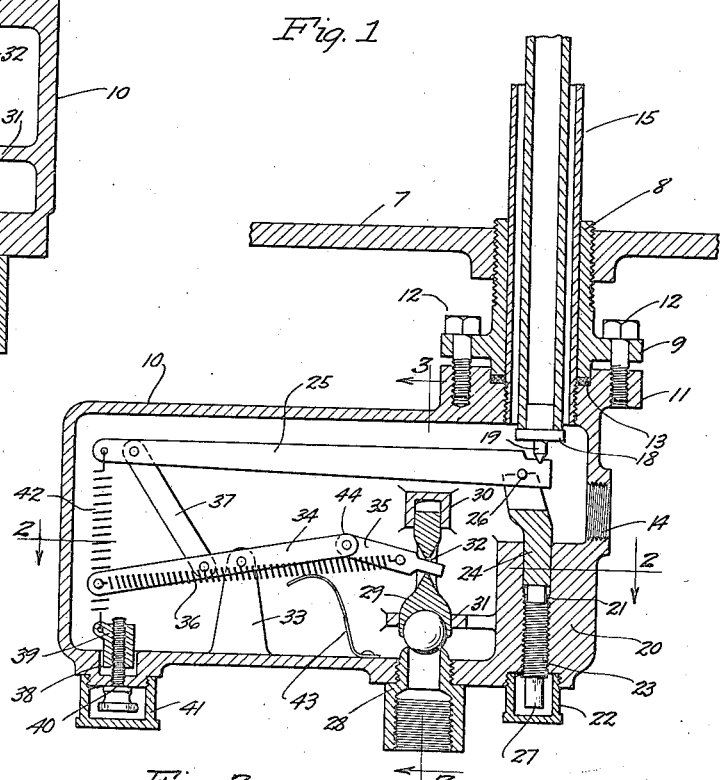
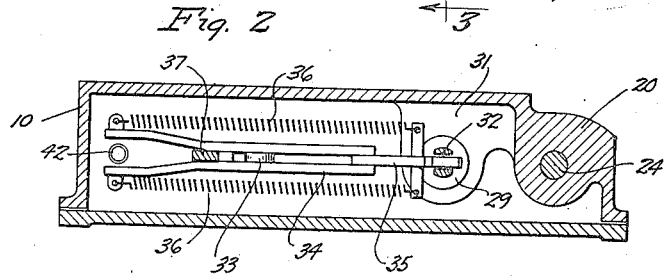
Inventor
Ezra S. Hoyt
by Westall and Wallace
his Attorneys Mar. 20, 1923.
E. S. HOYT
1,449,005
THERMOSTATICALLY ACTUATED VALVE
Filed Mar. 16, 1922　　2 sheets-sheet 2
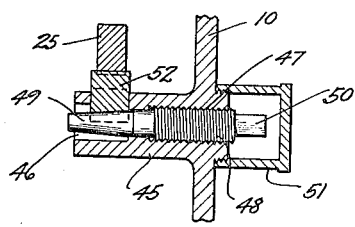
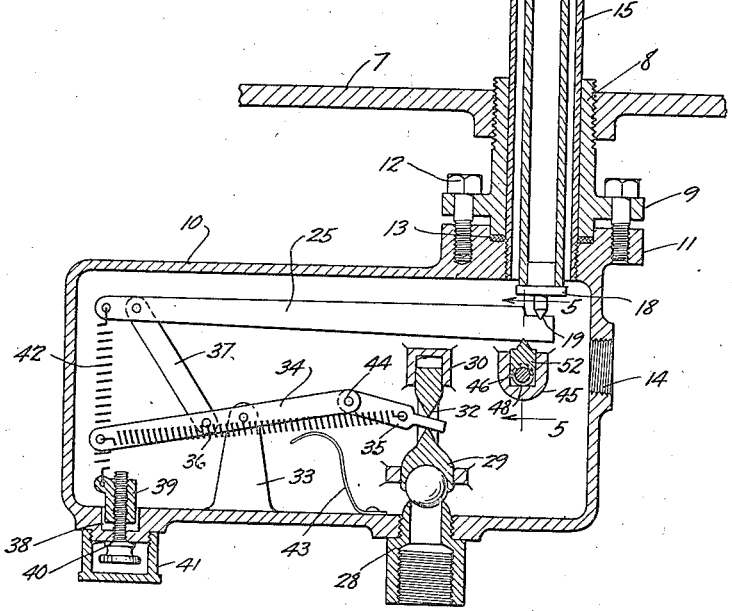
Inventor
Ezra S. Hoyt
by Westall and Wallace
his Attorneys Patented Mar. 20, 1923.

1,449,005

UNITED STATES PATENT OFFICE.

EZRA S. HOYT, OF LOS ANGELES, CALIFORNIA.

THERMOSTATICALLY-ACTUATED VALVE.

Application filed March 16, 1922. Serial No. 544,354.

*To all whom it may concern:*

Be it known that I, EZRA S. HOYT, a citizen of the United States, residing at Los Angeles, in the county of Los Angeles and State of California, have invented new and useful Improvements in a Thermostatically-Actuated Valve, of which the following is a specification.

This invention relates to a valve actuated by changes in temperature of a body, and pertains particularly to a valve controlling the supply of heat to a body, and itself controlled by the temperature of that body.

It is the primary object of this invention to provide a snap-over valve mechanism actuated by a thermostatic medium at certain limits of its expansion and contraction. The invention is disclosed herein as a valve controlling the flow of a fluid fuel for a burner, and actuated by the temperature of a fluid heated by the burner. It is another object of this invention to provide a snap-over mechanism, which is easily adjusted for different limits of temperature. In addition to the broader objects of this invention, there are certain details of design, whereby a simple, positive, and easily adjustable valve mechanism is obtained.

These objects are accomplished by means of the embodiment of my invention illustrated in the accompanying drawings, in which:

Fig. 1 is a vertical sectional view of one form of a complete valve mechanism; Fig. 2 is a section taken on the line 2—2 of Fig. 1; Fig. 3 is an enlarged section taken on the line 3—3 of Fig. 1; Fig. 4 shows a modified form of construction in vertical section; and Fig. 5 is an enlarged section taken on the line 5—5 of Fig. 4.

Referring more particularly to Figs. 1, 2, and 3, a portion of the shell of a boiler or heater is indicated by 7. A threaded opening is formed therein, and in the opening is a bushing 8. The bushing is formed with ears 9 having bolt holes therein. A casing 10 has an extension 11 provided with ears to receive the bolts 12 passing through the bolt holes in the ears 9. Extension 11 is counterbored at the upper end, and in the recess formed thereby is disposed a packing ring 13. Bushing 8 is formed with an extension in the nature of a gland, which engages the packing 13 and compresses the latter. An inlet opening 14 is provided in one side of the casing for the entrance thereinto of gas.

Threaded into the extension 11 is a metallic tube 15, preferably of copper, and closed at its upper end by a plug 16. Disposed within the tube 15 is a rod 17, preferably of porcelain. Mounted on the end of the rod is a button 18 having a finger 19 adapted to engage a lever. Changes of temperature of the fluid within the boiler cause the tube 15 to contract and expand. This causes a movement of the rod 17 with respect to the casing 10.

Disposed in one corner of the casing 10 is a fillet 20 having a bore extending therethrough and threaded at its lower end. The outer end of the bore 21 is counterbored and threaded to receive a cap 22. Disposed within the bore and engaged with the threads thereof is an adusting pin 23 having an extension at the upper end engaging the stem of a fulcrum member 24. The fulcrum member is bifurcated at the upper end so as to straddle an operating lever 25. Lever 25 is pivotally mounted upon the fulcrum member by means of a pin 26 forming trunnions resting upon the fulcrum member with its axis spaced longitudinally from the point at which the finger 19 engages the lever. The head of pin 23 is flattened at 27 to form a wrench hold extending beyond the face of the casing 10, and covered by the cap 22 when in position.

At the lower part of the casing is a threaded opening in which is disposed a bushing 28, which extends upwardly and forms a seat for a valve 29. The valve has a rounded seating surface and a stem disposed in a socket formed in a projection 30, preferably formed integral with the casing. A guide bracket 31 extends from the casing and slidably disposed therein is the valve. Extending through the stem of the valve is an opening 32 having bevelled upper and lower edges. The valve 29 controls the flow of gas from the casing, and bushing 28 is adapted to be connected to the piping leading to a gas burner for supplying heat to the boiler. Formed on the casing is a standard 33, and mounted thereon is a snap-over lever. The snap-over lever comprises a member 34 embracing the upper end of the standard 33 and is pivotally secured thereto so that it may rock. Pivotally secured to one end of the member 34 is a finger 35 extending through opening 32. Snap-over springs 36 are secured adjacent the outer ends of member 34 and finger 35. A connecting link 37 is secured to member 34 and lever 25 for transmitting motion from lever 25 to member 34. An opening is formed in the casing below the end of lever 25 and is counter-bored at the inner end to receive a block 39 having a threaded bore. Engaged with the block 39 is a screw 40 having a knurled head extending outside of the casing. By turning the screw 40 the block 39 may be raised and lowered. A cap 41 is threaded onto a nipple and covers the screw head. Secured to an ear upon the block 39 is a tension spring 42 having the outer end thereof secured to lever 25. Adjustment of the block 39 changes the tension on spring 42, thereby maintaining the lever 25 in contact with the finger 19, and changing the tension will also change the temperature at which the valve acts. A leaf spring 43 is disposed to be engaged by lever 34 and forms a cushion, so that when it snaps downwardly its movement will be arrested.

Assume the valve to be in the closed position shown in Fig. 1, the supply of gas to the burner being cut off. The fluid in the boiler cools, tube 15 contracts, and rod 17 is forced downwardly, the finger 19 exerting pressure upon lever 25 and swinging the outer end upwardly. Motion is transmitted by link 37 to the snap-over lever until the joint 44 moves over center, whereupon springs 36 cause the lever 34 and finger 35 to buckle, snapping the valve 29 off its seat and fully opening it. Gas is supplied to the burner and the fluid in the boiler is heated, the tube 15 expanding. This causes the rod 17 to be raised and the finger 19 to be moved upwardly. Spring 42 causes the lever 25 to follow the finger and motion to be transmitted from the lever 25 to member 34. When the knuckle 44 has been moved over center in the opposite direction, springs 36 cause the valve 29 to be snapped into closed position, completely shutting off the gas supply to the burner. In order to regulate the valve, the fulcrum member 24 is raised or lowered by means of the adjusting pin 23. By raising the fulcrum member, the valve is adjusted to open at a higher temperature, and by lowering the fulcrum member, the valve is adjusted to be opened at a lower temperature. This is a rough adjustment and a more delicate and final adjustment is made by changing the tension of spring 42. It is merely necessary to remove the cap 22 and engage the adjusting pin with a wrench, whereupon the latter may be turned to raise or lower the fulcrum member. By removing cap 41 the head of screw 40 is exposed for adjusting the tension of spring 42.

In Figs. 4 and 5, a device substantially the same as that shown in Figs. 1, 2, and 3, is illustrated. The difference resides in the means for adjusting the fulcrum point of lever 25. Projecting into the interior of the casing 10 is an extension 45 provided with a bore 46 having an opening at its upper side. The bore is threaded at one end as indicated by 47 and disposed therein is an adjusting pin 48 having a tapered end 49. At the head end the pin is provided with a flat portion 50 to provide a wrench hold, this portion extending outside of the casing and being covered by a cap 51. Mounted in the lateral opening in bore 46 is a fulcrum block 52. This block rests upon the tapered pin 48, so that by moving the adjusting pin into or out of the casing 10, the fulcrum block will be correspondingly raised and lowered. This adjustment serves the same purpose as the adjustment disclosed in the first described form of the invention and the operation of the mechanism is substantially the same.

What I claim is:

1. In a valve mechanism, the combination of a thermostatically expansible element, an operating lever of the first class adapted to be moved thereby, the power application arm being relatively short, a fulcrum member, supporting means for raising and lowering said fulcrum member, a jointed snap-over toggle, tension springs anchored to the ends of and tending to buckle said snap-over toggle, said snap-over toggle being pivotally mounted on said casing intermediate the ends of a joint, a link connecting said operating lever and said snap-over toggle, whereby movement of the former will throw the joint of said snap-over toggle over center, adjustable resilient means secured to the power transmitting end of said lever acting against said thermostatically expansible element, and a valve controlling a fuel adapted to be moved by said snap-over toggle.

2. In a valve mechanism, the combination of a thermostatically expansible element, an operating lever of the first class adapted to be moved thereby, the power application arm being relatively short, a fulcrum member freely movable to and from said lever, an adjusting member movable transversely to said fulcrum member and having an inclined surface upon which said fulcrum member rests, a jointed snap-over toggle, springs tending to buckle said snap-over toggle, a link connecting said operating lever and snap-over toggle, whereby movement of the former will throw the joint of said snap-over toggle over center, and a valve controlling a fuel adapted to be moved by said snap-over toggle.

3. In a valve mechanism, the combination of a thermostatically expansible element, an operating lever of the first class adapted to be moved thereby, the power application arm being relatively short, a fulcrum member freely movable to and from said lever, an adjusting member movable transversely to said fulcrum member and having an inclined surface upon which said fulcrum member rests, a jointed snap-over toggle, springs tending to buckle said snap-over toggle, a link connecting said operating lever and snap-over toggle, whereby movement of the former will throw the joint of said snap-over toggle over center, adjustable resilient means secured to the power transmitting end of said lever acting against said thermostatically expansible element, and a valve controlling a fuel adapted to be moved by said snap-over toggle.

4. In a valve mechanism, a casing having an inlet and an outlet for fuel and having encased therein the combination of a thermostatically expansible element, an operating lever of the first class adapted to be moved thereby and disposed within said casing, the power application arm being relatively short, a fulcrum member, supporting means for raising and lowering said fulcrum member adjustable from the outside of said casing, a jointed snap-over toggle, tension springs anchored to the ends of and tending to buckle said snap-over toggle, said snap-over toggle being pivotally mounted in said casing intermediate the ends of a joint, a link connecting said operating lever and snap-over toggle, whereby movement of the former will throw the joint of said snap-over toggle over center, and a valve controlling the outlet of said casing and adapted to be moved by said snap-over toggle.

5. In a valve mechanism, a casing having an inlet and an outlet for fuel and having encased therein the combination of a thermostatically expansible element, an operating lever of the first class adapted to be moved thereby and disposed within said casing, the power application arm being relatively short, a fulcrum member, supporting means for raising and lowering said fulcrum member adjustable from the outside of said casing, a jointed snap-over toggle, tension springs anchored to the ends of and tending to buckle said snap-over toggle, said snap-over toggle being pivotally mounted in said casing intermediate the ends of a joint, a link connecting said operating lever and snap-over toggle whereby movement of the former will throw the joint of said snap-over toggle over center, adjustable resilient means secured to the power transmitting ends of said lever acting against said thermostatically expansible element, and a valve controlling the outlet of said casing and adapted to be moved by said snap-over toggle.

6. In a valve mechanism, a casing having an inlet and an outlet for fuel and having encased therein, the combination of a thermostatically expansible element, an operating lever of the first class adapted to be moved thereby and disposed within said casing, the power application arm being relatively short, a fulcrum block, a tapered pin upon which said fulcrum block is supported, said pin being movable axially to raise and lower said block and extending through said casing, a jointed snap-over toggle, springs tending to buckle said snap-over toggle, a link connecting said operating lever and snap-over toggle, whereby movement of the former will throw the joint of said snap-over toggle over center, and a valve controlling the outlet of said casing and adapted to be moved by said snap-over toggle.

7. In a valve mechanism, a casing having an inlet and outlet for fuel and having encased therein the combination of a thermostatically expansible element, an operating lever of the first class adapted to be moved thereby, the power application arm being relatively short, a fulcrum block, a tapered pin upon which said fulcrum block is supported, said pin being movable axially to raise and lower said block and extending through said casing, a jointed snap-over toggle, springs tending to buckle said snap-over toggle, a link connecting said operating lever and said snap-over toggle, whereby movement of the former will throw the joint of said snap-over toggle over center, adjustable resilient means secured to the power transmitting end of said lever acting against said thermostatically expansible element, and a valve controlling the outlet of said casing and adapted to be moved by said snap-over toggle.

In witness that I claim the foregoing I have hereunto subscribed my name this 6th day of March, 1922.

EZRA S. HOYT.